(12) United States Patent
Dai et al.

(10) Patent No.: US 12,147,282 B2
(45) Date of Patent: Nov. 19, 2024

(54) CONTROLLERS TO DRIVE POWER CIRCUITS BASED ON CURRENTS DRAWN

(71) Applicant: Hewlett-Packard Development Company, L.P., Spring, TX (US)

(72) Inventors: Fangyong Dai, Spring, TX (US); Qijun Chen, Spring, TX (US); Ann Alejandro Villegas, Spring, TX (US); Ling Wei Chung, Spring, TX (US); Daniel Joseph Luc, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 125 days.

(21) Appl. No.: 18/005,183

(22) PCT Filed: Aug. 3, 2020

(86) PCT No.: PCT/US2020/044763
§ 371 (c)(1),
(2) Date: Jan. 11, 2023

(87) PCT Pub. No.: WO2022/031264
PCT Pub. Date: Feb. 10, 2022

(65) Prior Publication Data
US 2023/0251697 A1    Aug. 10, 2023

(51) Int. Cl.
*G06F 1/26* (2006.01)
(52) U.S. Cl.
CPC .................................. *G06F 1/26* (2013.01)
(58) Field of Classification Search
CPC ............................................. G06F 1/26
See application file for complete search history.

(56) References Cited

U.S. PATENT DOCUMENTS

| | | |
|---|---|---|
| 5,717,319 A | 2/1998 | Jokinen |
| 7,098,636 B2 | 8/2006 | Koerner et al. |
| 7,759,916 B2 | 7/2010 | Kleveland |
| 8,024,138 B2 | 9/2011 | Carroll et al. |
| 9,268,347 B2 | 2/2016 | Covi et al. |
| 9,588,530 B2 | 3/2017 | Pujol et al. |
| 2001/0003207 A1 | 6/2001 | Kling et al. |
| 2005/0024035 A1 | 2/2005 | Tabaian et al. |
| 2006/0127066 A1* | 6/2006 | Chiu ............... F04D 27/004 388/804 |

(Continued)

FOREIGN PATENT DOCUMENTS

| | | |
|---|---|---|
| CN | 1864114 A | 11/2006 |
| TW | 200949524 A | 12/2009 |

*Primary Examiner* — Stefan Stoynov
(74) *Attorney, Agent, or Firm* — Knobbe, Martens, Olson & Bear, LLP

(57) ABSTRACT

In some examples, an electronic device comprises a processor and a power circuit coupled to the processor. The power circuit is to provide power to the processor and to measure a current drawn from the power circuit by the processor. The electronic device also comprises a voltage regulator controller coupled to the processor and the power circuit. The voltage regulator controller is to receive a current usage prediction from the processor, receive the measurement from the power circuit, compare the current usage prediction and the measurement, and, based on the comparison, drive the power circuit in accordance with the measurement instead of the current usage prediction.

5 Claims, 3 Drawing Sheets

(56) References Cited

U.S. PATENT DOCUMENTS

| | | |
|---|---|---|
| 2008/0157743 A1 | 7/2008 | Martin et al. |
| 2008/0231342 A1 | 9/2008 | Tabaian et al. |
| 2009/0198460 A1 | 8/2009 | Carroll et al. |
| 2011/0291634 A1* | 12/2011 | Takata .................... H02M 1/32 323/285 |
| 2023/0104685 A1* | 4/2023 | Leung ....................... G06F 1/28 713/320 |

* cited by examiner

CONTROLLERS TO DRIVE POWER CIRCUITS BASED ON CURRENTS DRAWN

BACKGROUND

Various electronic devices, such as notebook computers and smartphones, include central processing units (CPUs) and dedicated power supplies that supply power to the CPUs. Such a dedicated power supply often includes a voltage regulator controller (VRC) that drives power circuits (e.g., including power transistors) to supply power to the CPU. Because the power demands (and, more specifically, current demands) of the CPU are variable, the CPU repeatedly predicts its future current usage and communicates these current usage predictions to the VRC. The VRC, in turn, drives the power circuitry to supply current to the CPU based on the CPU's current usage predictions.

BRIEF DESCRIPTION OF THE DRAWINGS

Various examples will be described below referring to the following figures.

DETAILED DESCRIPTION

As explained above, because the power demands (and, more specifically, current demands) of a central processing unit (CPU) are variable, the CPU may repeatedly predict its future current usage and communicate those current usage predictions to a voltage regulator controller (VRC). The VRC, in turn, may adjust the current output capacity of the power circuitry based on the CPU's current usage predictions.

Often, however, the CPU overestimates its future current usage, leading the VRC to adjust the power circuitry to have excessive current output capacity. In battery-powered devices, this excessive current output capacity is inefficient and results in unnecessary battery drain. The excess current output capacity also causes the electronic device to experience an unnecessary rise in temperature, potentially damaging one or more components or possibly rendering the electronic device inoperable.

This disclosure describes examples of a power supply VRC that mitigates the challenges mentioned above by verifying the accuracy of current usage predictions received from a CPU. In response to an accurate current usage prediction received from the CPU, the VRC may set the current output capacity of its power circuitry in accordance with the current usage prediction. However, in response to an inaccurate current usage prediction received from the CPU, the VRC may override the CPU's current usage prediction and instead may set the current output capacity of the power circuitry in accordance with the current actually being consumed by the CPU. In the latter case, in response to a rise in current draw (e.g., a current draw exceeding a threshold, for example, a pulse width of the current exceeding a threshold), the VRC may set the current output capacity of its power circuitry in accordance with the CPU's most recent current usage prediction. The VRC may implement this technique for any number of power rails provided to the CPU. In this manner, unnecessary power loss, battery drain, and temperature rises are mitigated.

Figure 1:
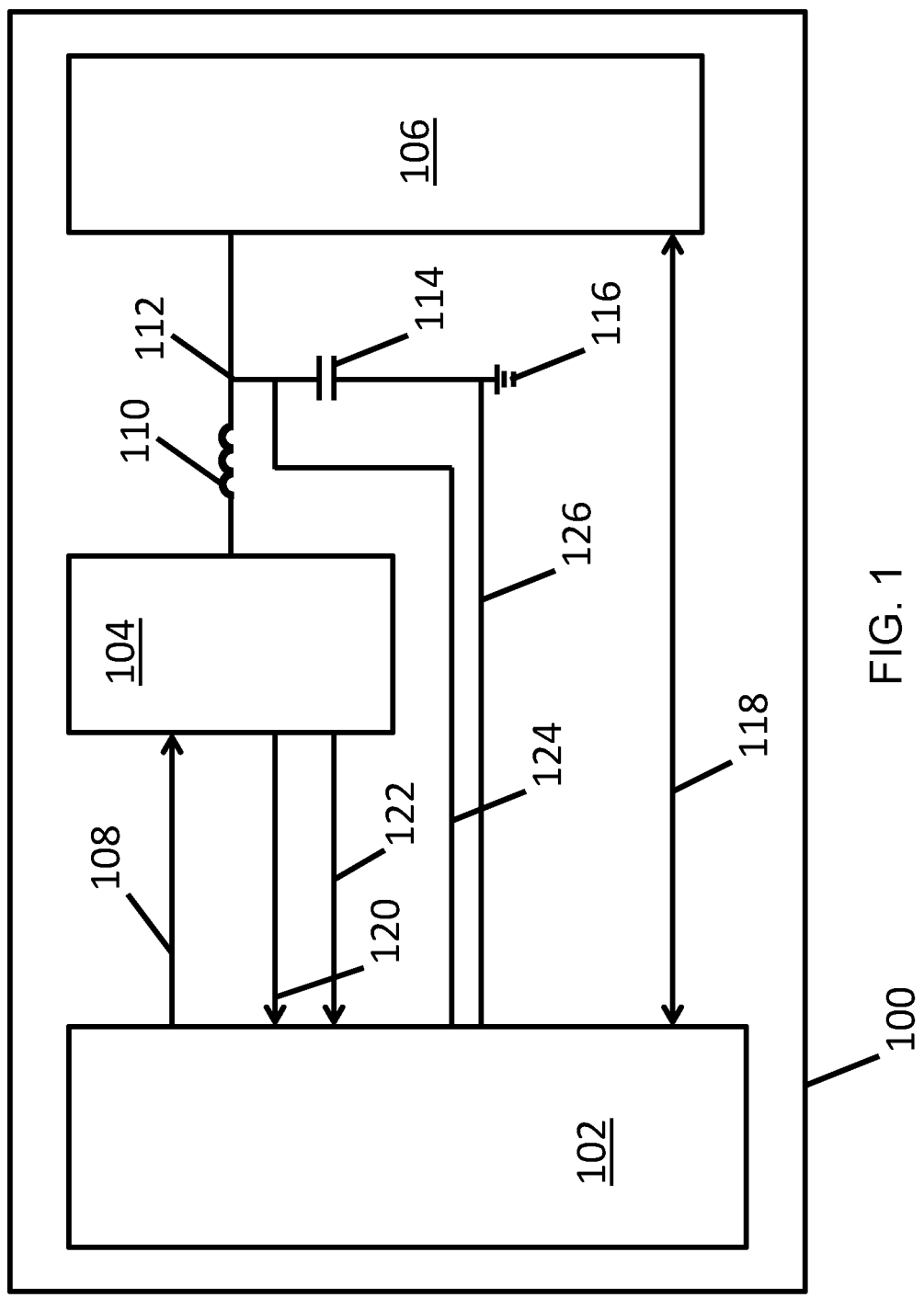
FIG. 1 is a schematic diagram depicting an electronic device in which a voltage regulator controller (VRC) drives a power circuit to power a central processing unit (CPU) in accordance with various examples.

FIG. 1 is a schematic diagram depicting an electronic device 100 in accordance with various examples. The electronic device 100 may be any device that comprises a CPU, such as a notebook computer, a desktop computer, a smartphone, a wireless headset, a tablet, etc. The electronic device 100 may be a battery-powered device. The scope of this disclosure is not limited to any particular type of electronic device 100.

The electronic device 100 may include a VRC 102, a power circuit 104, and a CPU 106. The VRC 102 may couple to the power circuit 104 by way of a pulse width modulation (PWM) output 108. The power circuit 104 may couple to the VRC 102 by way of a temperature output 120 and a measured current drawn output 122. The power circuit 104 may couple to the CPU 106 by way of an inductor 110 that may couple to a voltage output node 112, which, in turn, may couple to the CPU 106 (e.g., a power supply rail of the CPU 106). A capacitor 114 may couple to the output node 112 and to a ground terminal 116. Together, the inductor 110 and the capacitor 114 may form a low-pass filter circuit. The output node 112 may couple to a voltage sense input 124 of the VRC 102 and the ground terminal 116 may couple to a return voltage input 126 of the VRC 102. The CPU 106 may couple to the VRC 102 by way of a bus 118. In examples, the bus 118 may be a serial voltage identification (SVID) bus.

Figure 2:
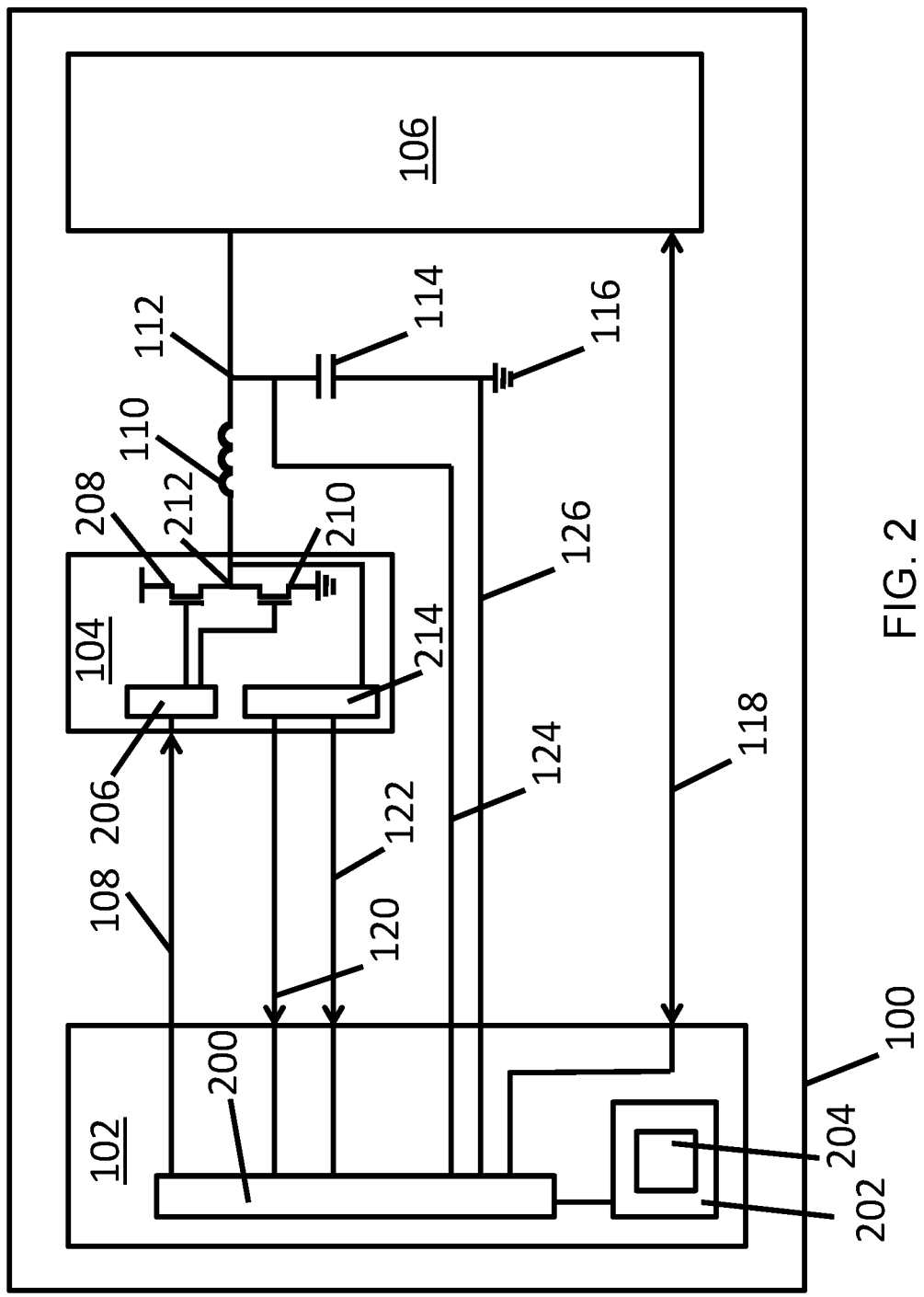
FIG. 2 is a schematic diagram depicting an electronic device in which a VRC including a processor and a computer-readable medium drives a power circuit having multiple power transistors to power a CPU in accordance with various examples.

In examples, the VRC 102 may be a microcontroller comprising a processor and storing, e.g., executable code such as software or firmware. In examples, the power circuit 104 may comprise multiple power transistors (e.g., field effect transistors (FETs)), such as in a switch mode power supply (SMPS). The power circuit 104 may comprise a driver circuit to drive the power transistors based on a PWM drive signal received via the PWM output 108. The power circuit 104 also may comprise a sensing circuit that is to sense a temperature of the power circuit 104 and to provide the sensed temperature to the VRC 102 via the temperature output 120. In addition, the sensing circuit may sense a current drawn by the CPU 106 via the inductor 110 and provide a signal indicating the measured current drawn to the VRC 102 via the measured current drawn output 122. FIG. 2 depicts the example contents of the VRC 102 and the power circuit 104 in greater detail and is described below.

In operation, the VRC 102 may drive the power circuit 104 by supplying a PWM drive signal on the PWM output 108, and the power circuit 104 may adjust its power output capability (e.g., current output capability), meaning the power available for the CPU 106 to draw from the power circuit 104, based on the received PWM drive signal. By drawing power from the power circuit 104, the CPU 106 may be enabled to perform its functions.

In examples, the CPU 106 may be programmed to predict its future power usage. For example, the CPU 106 may be programmed to predict its future current usage. The CPU 106 may be programmed to predict its current usage for any suitable length of time. For instance, the CPU 106 may predict its current usage for the 10 seconds following its prediction, for the 1 second following its prediction, for the 100 milliseconds following its prediction, for the 10 milliseconds following its prediction, and/or for the 1 millisecond following its prediction. Other lengths of time are contemplated for the CPU's current usage predictions. In some examples, the CPU predicts its current usage based on instructions in the CPU pipeline, with some instructions causing the CPU to increase its current usage prediction and with other instructions causing the CPU to decrease its current usage prediction.

In examples, the CPU 106 may repeatedly (e.g., regularly) predict its future current usage and may repeatedly (e.g., regularly) provide signals indicating these predictions to the VRC 102 via the bus 118. The CPU 106 may provide these predictions to the VRC 102 as part of a request to the VRC 102 to drive the power circuit 104 via the PWM output 108 in a manner that provides the CPU 106 with current (or more generally, power) in accordance with the current usage predictions of the CPU 106. However, as explained above, in some situations, the current usage predictions provided by the CPU 106 to the VRC 102 may be inaccurate. For instance, the current usage predictions may overestimate the current that will actually be consumed by the CPU 106.

Accordingly, the VRC 102 may be programmed to verify current usage predictions received from the CPU 106. In some examples, the VRC 102 may receive information from the power circuit 104 that the VRC 102 may use to verify the current usage predictions received from the CPU 106. For example, the power circuit 104 may measure the current drawn by the CPU 106 via the inductor 110 and the output node 112, and the power circuit 104 may communicate the measured current drawn to the VRC 102 via the measured current drawn output 122. To verify the current usage prediction received from the CPU 106, the VRC 102 may compare the current usage prediction to the measured current drawn (as indicated by the power circuit 104 via the measured current drawn output 122) and determine whether a difference between the two values is within a programmed threshold. If the difference between the two values is within a threshold, the values may be considered sufficiently proximate to each other such that the current usage prediction provided by the CPU 106 is accurate and thus verified. However, if the VRC 102 determines that the difference between the two values meets or exceeds the threshold, the values may be considered excessively different, and so the current usage prediction provided by the CPU 106 may be deemed inaccurate. In some examples, the VRC 102 may determine that the current usage prediction of the CPU 106 is inaccurate in response to the difference between the two values exceeding a threshold for at least a programmed amount of time. To determine whether the difference between the two values exceeds a threshold for at least a programmed amount of time, the VRC 102 may receive multiple current usage predictions from the CPU 106 and multiple current drawn measurements from the power circuit 104 over the programmed amount of time.

In response to the VRC 102 determining that the current usage prediction from the CPU 106 is accurate, the VRC 102 may issue an appropriate PWM drive signal on the PWM output 108 such that the output current capacity of the power circuit 104 is set according to the current usage prediction. However, in response to the VRC 102 determining that the current usage prediction from the CPU 106 is inaccurate, the VRC 102 may issue a PWM drive signal on the PWM output 108 such that the current output capacity of the power circuit 104 is set based on the measured current drawn by the CPU 106. For example, if the CPU 106 provides a current usage prediction of 40 Amperes (A), but the power circuit 104 senses that the current being drawn by the CPU 106 via the inductor 110 is 20 A, the VRC 102 may reduce the current output capacity of the power circuit 104 such that the power circuit 104 current output capacity is at 20 A or incrementally above 20 A (e.g., 5 to 10 percent higher than 20 A).

In other examples, the VRC 102 may issue a PWM drive signal on the PWM output 108 based on the lesser of the measured current drawn and the current usage prediction. The VRC 102 may resume driving the power circuit 104 in accordance with the most recent current usage prediction in response to the CPU 106 commanding the VRC 102 to do so, or in response to the VRC 102 detecting a rise in current usage by the CPU 106 exceeding a threshold. For example, if the power circuit 104 indicates that a pulse width of the current drawn by the CPU 106 has exceeded a programmed threshold, the VRC 102 may resume driving the power circuit 104 in accordance with the most recently received current usage prediction. In another example, the VRC 102 may receive a first pulse width and a second pulse width (where the first and second pulse widths are not necessarily the widths of consecutive pulses) for the current drawn by the CPU 106 from the power circuit 104. The VRC 102 may use the first and second pulse widths to calculate a rate of pulse width change. In response to the rate of pulse width change exceeding a threshold, the VRC 102 may drive the power circuit 104 in accordance with a most recent current usage prediction received from the processor.

During operation, the VRC 102 may measure the voltage across the capacitor 114 using the voltage sense input 124 and the return voltage input 126. The VRC 102 may then adjust the PWM drive signal on the PWM output 108 as appropriate and in consideration of the current being provided to the CPU 106 to provide a target power level to the CPU 106. In this way, the voltage sense input 124 and the return voltage input 126 form part of a voltage feedback loop.

Variations of the examples described above are contemplated. For instance, in some examples, the power circuit 104 may experience an increase in temperature due to high power output by the power transistors in the power circuit 104. Accordingly, the power circuit 104 may measure the temperature of the power circuit 104 and provide temperature measurements to the VRC 102 via the temperature output 120. If the measured temperature of the power circuit 104 exceeds a programmed threshold, the VRC 102 may reduce the power output of the power circuit 104 and may increase the power output of a second power circuit (not depicted in FIG. 1; depicted in FIG. 3). In this way, the temperature of the power circuit 104 may be reduced. In examples, if multiple power circuits are available, the VRC 102 may receive temperature measurements for the multiple power circuits and may adjust the power outputs of the multiple power circuits so that the temperatures of the multiple power circuits are within a programmed range of each other.

In some examples, the VRC 102 may implement different modes of operation. Specifically, the VRC 102 may implement a first mode, in which the VRC 102 drives the power circuit 104 in accordance with the most recent current usage prediction received from the CPU 106. In addition, the VRC 102 may implement a second mode, in which the VRC 102 drives the power circuit 104 in accordance with the measured current drawn as provided by the power circuit 104. In operation, when the VRC 102 receives a current usage prediction from the CPU 106, the VRC 102 may implement the first mode. While driving the power circuit 104 in accordance with the first mode, the VRC 102 may determine a target current to associate with the second mode. Specifically, the VRC 102 may receive current drawn measurements from the power circuit 104. The VRC 102 may use the received current drawn measurements to determine an appropriate target current to be supplied to the CPU 106. For instance, the VRC 102 may use a single current drawn measurement, or the VRC 102 may determine a mean or a median current drawn measurement using multiple current drawn measurements over a programmed amount of time. Once an appropriate target current has been determined for the second mode, the VRC 102 may inactivate the first mode and instead implement the second mode.

While operating in the second mode, conditions may arise that cause the VRC 102 to inactivate the second mode and implement the first mode. For example, the CPU 106 may issue a command to the VRC 102 via the bus 118 that the VRC 102 is to implement the first mode. In response to receiving such a command, the VRC 102 may inactivate the second mode and implement the first mode, in which the VRC 102 drives the power circuit 104 in accordance with the most recently received current usage prediction. In other examples, the CPU 106 may temporarily begin drawing current in excess of the current made available by the power circuit 104 in the second mode (it is technically possible to draw current in excess of the current capacity of the power circuit 104 for short periods of time (e.g., 60-100 microseconds), so long as the temperature of the power circuit 104 does not exceed a threshold temperature). This may cause a rise in the pulse width of the current output of the power circuit 104. In response to a pulse width of the current output of the power circuit 104 exceeding a programmed threshold (e.g., for a duration of 1-2 clock cycles), the VRC 102 may inactivate the second mode and implement the first mode. In yet other examples, in response to the pulse width of the current output expanding at a rate exceeding a programmed threshold, the VRC 102 may inactivate the second mode and implement the first mode. Comparisons between the pulse width and thresholds may be made by the VRC 102, by the power circuit 104, or a combination thereof. In examples, the excess expansion in pulse width and the switch to the first mode may take less than 10 milliseconds.

FIG. 2 is a schematic diagram depicting the electronic device 100 in more detail. In examples, the VRC 102 may be a microcontroller comprising a processor 200 coupled to storage 202 (e.g., read-only memory, random access memory). The storage 202 may store executable code 204 (e.g., software, firmware), which, when executed by the processor 200, may cause the processor 200 to perform some or all of the actions attributed herein to the VRC 102. The programmed thresholds and other data described above as being used by the VRC 102 may, in some examples, be stored on the storage 202.

In addition, FIG. 2 depicts the power circuit 104 as comprising a driver circuit 206, a power transistor 208 (e.g., FET), a power transistor 210 (e.g., FET), and a measurement circuit 214. In examples, the power transistor 208 may comprise an N-channel FET, and in other examples, the power transistor 208 may comprise a P-channel FET. In examples, the power transistor 210 may comprise an N-channel FET, and in other examples, the power transistor 210 may comprise a P-channel FET. In examples, the power transistor 208 may have a gate terminal and two non-gate terminals (e.g., a source and a drain). One of the non-gate terminals of the power transistor 208 may couple to a voltage source, and the other non-gate terminal of the power transistor 208 may couple to a switching (SW) node 212. The power transistor 210 may have a gate terminal and two non-gate terminals (e.g., a source and a drain). One of the non-gate terminals of the power transistor 210 may couple to the ground terminal 116, and the other non-gate terminal may couple to the SW node 212. The gate terminals of the power transistors 208, 210 may couple to the driver circuit 206. The SW node 212 may couple to the inductor 110 and to the measurement circuit 214.

In operation, the driver circuit 206 may receive PWM drive signals from the VRC 102 and switch the power transistors 208, 210 accordingly. In addition, the measurement circuit 214 may measure the temperature of the power circuit 104 and/or the current flowing through SW node 212 toward the inductor 110 and provide the measurements to the VRC 102 as described above. Such current measurements may include, e.g., indications of pulse width of the current drawn by the CPU 106 via the SW node 212 and the inductor 110. The operation of the electronic device 100 of FIG. 2 is otherwise the same as described above with respect to FIG. 1.

Figure 3:
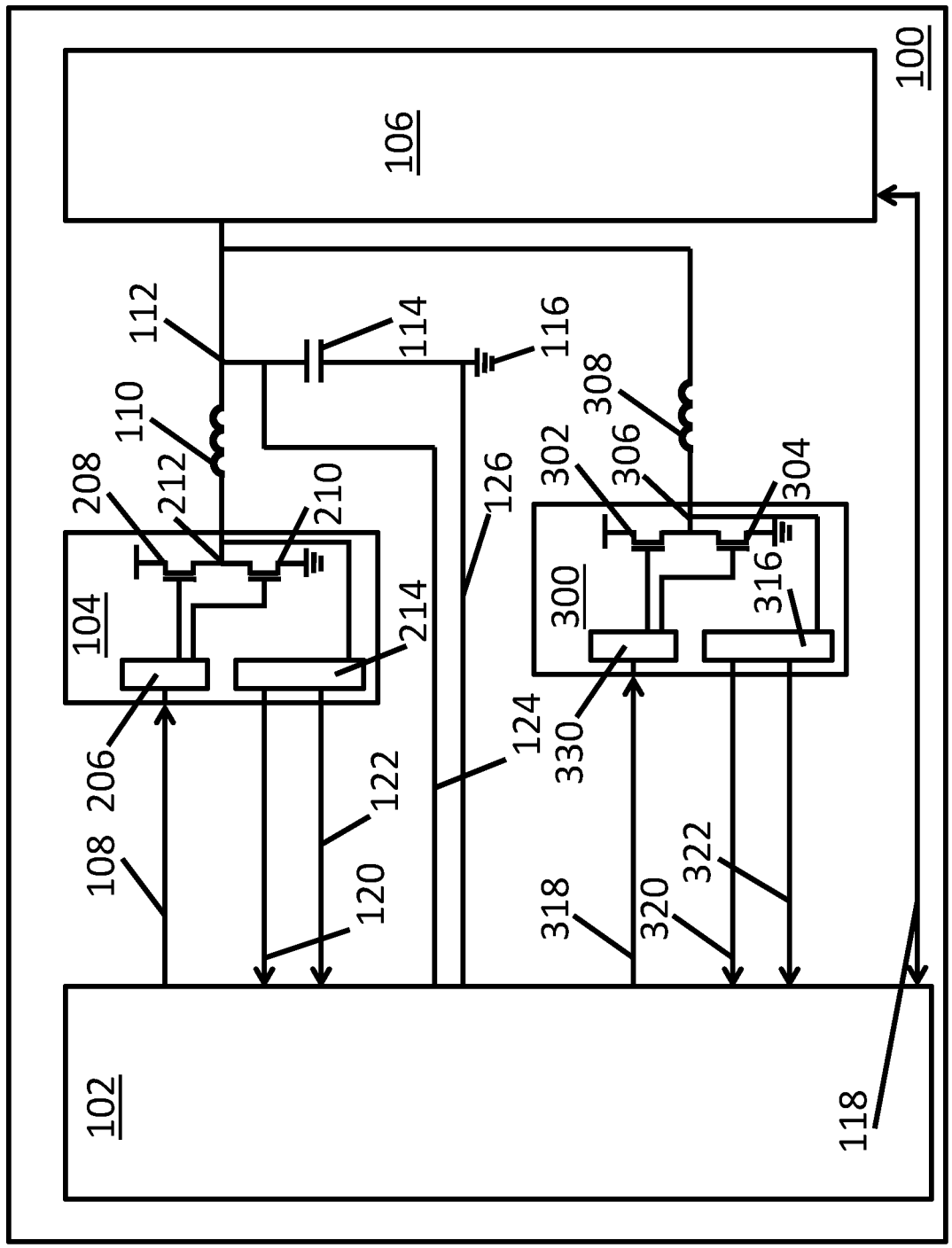
FIG. 3 is a schematic diagram depicting an electronic device in which a VRC drives multiple power circuits to power a CPU in accordance with various examples.

FIG. 3 is a schematic diagram of an example electronic device 100 comprising multiple power circuits. In particular, the electronic device 100 is the same as that depicted in FIGS. 1 and 2, except that it further includes a power circuit 300 and connections between the power circuit 300, the CPU 106, and the VRC 102. Specifically, the power circuit 300 may comprise a driver circuit 330, a power transistor 302 (e.g., N-channel FET or P-channel FET), a power transistor 304 (e.g., N-channel FET or P-channel FET), and a measurement circuit 316. The power transistor 302 may include a gate terminal that couples to the driver circuit 330, a non-gate terminal (e.g., a source or drain) that couples to a voltage source, and another non-gate terminal (e.g., a source or drain) that couples to a SW node 306. The power transistor 304 may include a gate terminal that couples to the driver circuit 330, a non-gate terminal (e.g., a source or drain) that couples to the ground terminal 116, and another non-gate terminal (e.g., source or drain) that couples to the SW node 306. The SW node 306 may couple to an inductor 308, which, in turn, couples to the output node 112. The SW node 306 also may couple to the measurement circuit 316.

The VRC 102 may couple to the driver circuit 330 via a PWM output 318. The measurement circuit 316 may couple to the VRC 102 via a temperature output 320 and a measured current drawn output 322. The contents of the VRC 102 in FIG. 3, although not expressly depicted, correspond to the contents of the VRC 102 as shown in FIG. 2. The operation of the power circuit 300 corresponds to the operation of the power circuit 104, including the interactions between the power circuit 104, the CPU 106, and the VRC 102. Thus, the individual operations of the power circuits 104, 300 are not described again here. However, the collective operation of the power circuits 104, 300 is now described.

In operation, the VRC 102 may drive the power circuits 104, 300 via the PWM outputs 108, 318. In response, the power circuits 104, 300 may make power available for the CPU 106 to draw via the inductors 110, 308, respectively. The VRC 102 may drive power circuits 104, 300 in any suitable manner so as to make available to the CPU 106 a desired power (e.g., a target current) via the node 112. Continuing with the example above, in response to the VRC 102 implementing the first mode in which a current usage prediction is 60 A, the VRC 102 may drive the power circuit 104 to make 40 A available to the CPU 106 and may drive the power circuit 300 to make 20 A available to the CPU 106. In addition, the VRC 102 may drive the power circuit 104 to make 30 A available to the CPU 106 and may drive the power circuit 300 to make 30 A available to the CPU 106. In addition, the VRC 102 may drive the power circuit 104 to provide 60 A and may inactivate the power circuit 300, or vice versa. In response to the VRC 102 determining that a temperature measurement received from one of the power circuits 104, 300 indicates that the power circuit 104, 300 is overheating, the VRC 102 may drive the other power circuit 104, 300 to provide more power and may drive the overheating power circuit 104, 300 to provide less power. For instance, in response to the power circuit 300 providing the VRC 102 with a temperature measurement via the temperature output 320, the VRC 102 may compare the temperature measurement to a programmed threshold. If the temperature measurement exceeds the programmed threshold, the VRC 102 may reduce the power output capacity of the power circuit 300 and increase the power output capacity of the power circuit 104 to compensate.

In another example operation, the VRC 102 may implement the first mode, in which the VRC 102 drives the power circuits 104, 300 such that the total current made available to the CPU 106 is in accordance with the current usage prediction supplied by the CPU 106. While the VRC 102 implements the first mode, the VRC 102 may receive measurements of currents drawn from the power circuits 104, 300 via the measured current drawn outputs 122, 322, respectively. The VRC 102 may determine that the actual current drawn by the CPU 106 differs from (e.g., is less than) that of the current usage prediction by at least a programmed threshold. In response, the VRC 102 may implement the second mode, in which the VRC 102 drives the power circuits 104, 300 so that their total combined current output capacity is equivalent to, or within a programmed range of, the measured current drawn by the CPU 106. However, in response to a determination that the pulse width of the current drawn by the CPU 106 is increasing (e.g., the pulse width exceeds a programmed threshold, or a rate of change in pulse width exceeds a programmed threshold), the VRC 102 may implement the first mode in lieu of the second mode. The example variations described above with respect to FIGS. 1 and 2 may also be applied to the example of FIG. 3.

In some examples, in response to determining that the first mode is to be inactivated and the second mode is to be implemented, the VRC 102 may determine whether one of the power circuits 104, 300 alone is sufficient to supply the measured currents drawn as indicated by the power circuits 104 (e.g., the total current drawn by the CPU 106). For example, if the power circuit 104 is capable of supplying up to 40 A and the power circuit 300 is capable of supplying up to 40 A, and further if the total current being drawn by the CPU 106 is 30 A, the VRC 102 may determine that the power circuit 104 (or the power circuit 300) is sufficient to power the CPU 106 and that the other power circuit may be inactivated. In such a case, implementation of the second mode by the VRC 102 may include inactivating one of the power circuits 104, 300 and using the remaining power circuit 104, 300 to supply power to the CPU 106. Thus, for instance, if the total current drawn by the CPU 106 is 30 A, the VRC 102 may cease driving the power circuit 300, and the VRC 102 may drive the power circuit 104 so that the power circuit 104 makes 30 A available to the CPU 106.

In the foregoing examples, a statement that a power circuit makes a certain amount of power or current available to the CPU should be understood to mean that the power circuit makes available a power or current level that is incrementally greater (e.g., 5 to 10 percent greater) than the stated power or current level. Thus, for example, a statement that a power circuit makes 20 A available to the CPU 106 should be understood to mean that the power circuit makes between 20 A and 22 A available to the CPU.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device, comprising:
    a processor;
    a power circuit coupled to the processor, the power circuit to provide power to the processor and to measure a current drawn from the power circuit by the processor; and
    a voltage regulator controller coupled to the processor and the power circuit, the voltage regulator controller to:
        receive a current usage prediction from the processor;
        receive the measurement of current drawn by the processor;
        in response to a comparison of the current usage prediction and the measurement, drive the power circuit to provide power to the processor in accordance with the measurement; and
        in response to a determination that a pulse width of a current output by the power circuit has exceeded a threshold, cease driving the power circuit in accordance with the measurement.

2. The electronic device of claim 1, wherein the voltage regulator controller is to perform the comparison by determining a difference between the current usage prediction and the measurement and determining whether the difference exceeds a threshold.

3. The electronic device of claim 1, wherein the measurement of current drawn by the processor is a median of multiple measurements of current drawn by the processor.

4. The electronic device of claim 1, wherein the measurement of current drawn by the processor is a mean of multiple measurements of current drawn by the processor.

5. The electronic device of claim 1, wherein the voltage regulator controller is to drive the power circuit in accordance with a second current usage prediction received from the processor in response to the pulse width exceeding the threshold.

* * * * *